United States Patent [19]
Lam

[11] Patent Number: 5,966,678
[45] Date of Patent: Oct. 12, 1999

[54] METHOD FOR FILTERING LASER RANGE DATA

[75] Inventor: Chi-Kin Lam, Sunn Valley, Calif.

[73] Assignee: The United States of America as represented by the Secretary of the Navy, Washington, D.C.

[21] Appl. No.: 09/081,713

[22] Filed: May 18, 1998

[51] Int. Cl.$^6$ .................................................. G01N 21/00
[52] U.S. Cl. ........................... 702/97; 382/272; 382/274; 356/73
[58] Field of Search ............................... 702/97; 382/274, 382/272, 260, 262, 263; 358/447; 356/73

[56] References Cited

U.S. PATENT DOCUMENTS

| | | | |
|---|---|---|---|
| 5,602,934 | 2/1997 | Li et al. | 382/128 |
| 5,682,225 | 10/1997 | DuBois et al. | 356/73 |
| 5,737,456 | 4/1998 | Carrington et al. | 382/299 |
| 5,812,702 | 9/1998 | Kundu | 382/260 |

*Primary Examiner*—Marc S. Hoff
*Assistant Examiner*—Hien Vo
*Attorney, Agent, or Firm*—David S. Kalmbaugh

[57] ABSTRACT

A computer software program for replacing drop-out pixels and erroneous range values in the range channel of a laser detection and ranging system with a median pixel value in a moving square window centered about a pixel being processed whenever a co-registered intensity pixel value in the intensity channel falls below an intensity threshold. During the processing of each range pixel of the target, the computer software program will not alter the range value of the pixel if its corresponding intensity pixel has an intensity value above the intensity threshold. When the intensity value of the corresponding intensity pixel is below the threshold, the intensity guided filter replaces the range value with the median value of all the "good" pixels within a moving window the size of a kernel having X and Y dimensions. This results in the intensity guided filter smoothing out noisy pixels in the range channel of while retaining edge pixel values for the image.

14 Claims, 4 Drawing Sheets

METHOD FOR FILTERING LASER RANGE DATA

BACKGROUND OF THE INVENTION

1. Field of the Invention

The present invention relates generally to laser detection and ranging system which are commonly referred to as LADAR systems. More specifically, the present invention relates to a method, implemented with a computer software program, for improving direct detection solid state laser (LADAR) imaging.

2. Description of the Prior Art

In the past, methods and apparatus have been developed for identifying targets, whether such targets have been stationary or moving. For example, in World War II the British developed and utilized radar for identifying the incoming aircraft of the German Luftwaffe. Radar uses radio waves (instead of the light waves that human eye uses to see) to locate objects at great distances even in bad weather or in total darkness. Currently, radar is employed in a wide variety of areas, including air traffic control, early warning systems for national defense, law enforcement of speed limits on highways, and weather forecasting, along with the more traditional use of radars which is target identification.

While ground-based and airborne radar are used to identify enemy ships, land based vehicles such as tanks and aircraft, radar is also used to aim and fire guns and missiles. In addition, radar has also been used to map terrain. While radar has proven quite effective in many areas over the years, radar is inherently limited because of its use of radio frequency signals and the size of the resultant antennas used to transmit and receive such radio frequency signals.

In an effort to overcome some of the limitations of radar systems, lasers have been employed in detection and ranging systems. Like radar, which takes its name from the phrase "radio detection and ranging," laser detection and ranging systems are referred to as LADAR systems. Like radar systems, which transmit radio waves and receive waves reflected from objects, often referred to as targets, LADAR systems transmit laser beams and receive the beams reflections from targets.

Because of the short wavelengths associated with laser beam transmissions, LADAR imaging exhibits a much greater resolution than radar imaging. In other words, LADAR is capable of accurately pinpointing a target when compared with the ability of radar to pinpoint a target.

The LADAR systems currently in use form two different types of images. However, before describing these images, it should be understood how these images are formed. A scan pattern is generated by scanning a pulsed laser beam in a pattern throughout a particular field. The generation of this scan pattern is somewhat similar to the manner in which an electron gun in a television set is rastered many times a second over the entire screen to generate a television image. In fact, LADAR images are frames of pixels having x rows and y columns to form a pixel array. The pixel array may be any of a variety of sizes, a common array size is 256 pixels per row and 256 pixels per column. One of the images generated in this manner is referred to as the "range" image. The range image is generated by determining the time between the departure of a laser pulse and the corresponding return laser pulse that has been reflected from an object in the pattern field. For display purposes, each range image is divided into range bands. A repeating color spectrum is assigned to each range band in the range image so that relative distances of objects in the range image can be perceived. For example, objects in a particular range image may be from 1,000 to 2,000 meters away from the LADAR, and the color bands may each be 100 meters. In this example, the range image would show ten repeating color bands. Each color band might use, for instance, five different colors to illustrate the relative range of an object within the color band. Blue might be used to represent the range of each object in the first 20 meters of a color band, with the colors green, yellow, red, and purple used to represent the range of objects in successive 20 meter bands of each color band.

The other type of image generated by a LADAR system is referred to as an "intensity" image. The intensity image is generated by determining the magnitude of each reflected laser pulse received by the LADAR system. Highly reflective objects in the field, such as light colored objects, appear lighter in the intensity image because the laser pulse reflected from these materials will have a relatively high magnitude. Poorly reflective materials, such as dark colored objects, appear darker in the intensity image because these materials absorb much of the transmitted laser pulse and, thus, the reflected pulse received by the LADAR system is relatively weak.

While the range and intensity images are useful for a variety of purposes, the intensity image has at least two unique uses. First, it provides an image that is typically easier for a person to interpret than the range image, because the intensity image looks very much like a black and white picture. The range and intensity images are typically viewed together, so that a person can identify features in the intensity image and then look to the range image to gain some understanding of the three dimensional aspects of the identified features. Second, the intensity image can be processed using automatic target recognition systems that use edge detection to identify and locate fixed, high value targets, such as buildings. For instance, a LADAR system can be mounted into the nose of a missile, and the data provided by the LADAR system can be used to guide the missile to the target. If the mission target is a fixed, high value target, an automatic target recognition system might be used to detect the target by detecting edges of the target appearing in the intensity image provided by the LADAR system.

For direct detection LADAR systems such as the Lockheed Martin Corporation Vought solid state LADAR, the amplitude or intensity of the return pulse from a target is a measure of the quality of the signal. A high intensity image corresponds to a high degree of confidence in the accuracy of a range measurement to a target. On the other hand a low intensity image corresponds to a weak signal and the very good probability of noise contamination.

Thus, there is a need for a means to generate sharper intensity images to facilitate and improve the operation of direct detection LADAR systems since it would be easier for such systems to locate targets if such targets were better defined by a sharper intensity image. Of course, sharper intensity images would also enhance the use of LADAR systems in other areas, such as terrain mapping.

SUMMARY OF THE INVENTION

The present invention was designed primarily to overcome and reducing the effects of one or more of the problems mentioned above. However, the present invention may overcome other problems not mentioned herein.

The method of the present invention uses an intensity guided filter in the form of a computer program to replace drop-out pixels and erroneous range values in the range channel of a LADAR system with a median pixel value in a moving square window centered about the pixel being processed whenever a co-registered intensity pixel value in the intensity channel falls below an intensity threshold. The intensity of the return pulse from a target is a measure of the quality of the signal. A high intensity image corresponds to a high degree of confidence in the accuracy of a range measurement to a target, while a low intensity image corresponds to a weak signal and a very good probability of noise contamination. During the processing of each range pixel of the target, the intensity guided filter will not alter the range value of the pixel if its corresponding intensity pixel has an intensity value above the intensity threshold. When the intensity value of the corresponding intensity pixel is below the threshold, the intensity guided filter replaces the range value with the median value of all the "good" pixels within a moving window the size of a kernel having X and Y dimensions. This results in the intensity guided filter smoothing out noisy pixels in the range channel of while retaining edge pixel values for the image.

DETAILED DESCRIPTION OF THE PREFERRED EMBODIMENT

The preferred embodiment of the present invention will now be discussed with reference to all the figures of the drawings wherein like parts are identified by like reference numerals in so far as it is practical to do so.

Figure 1:
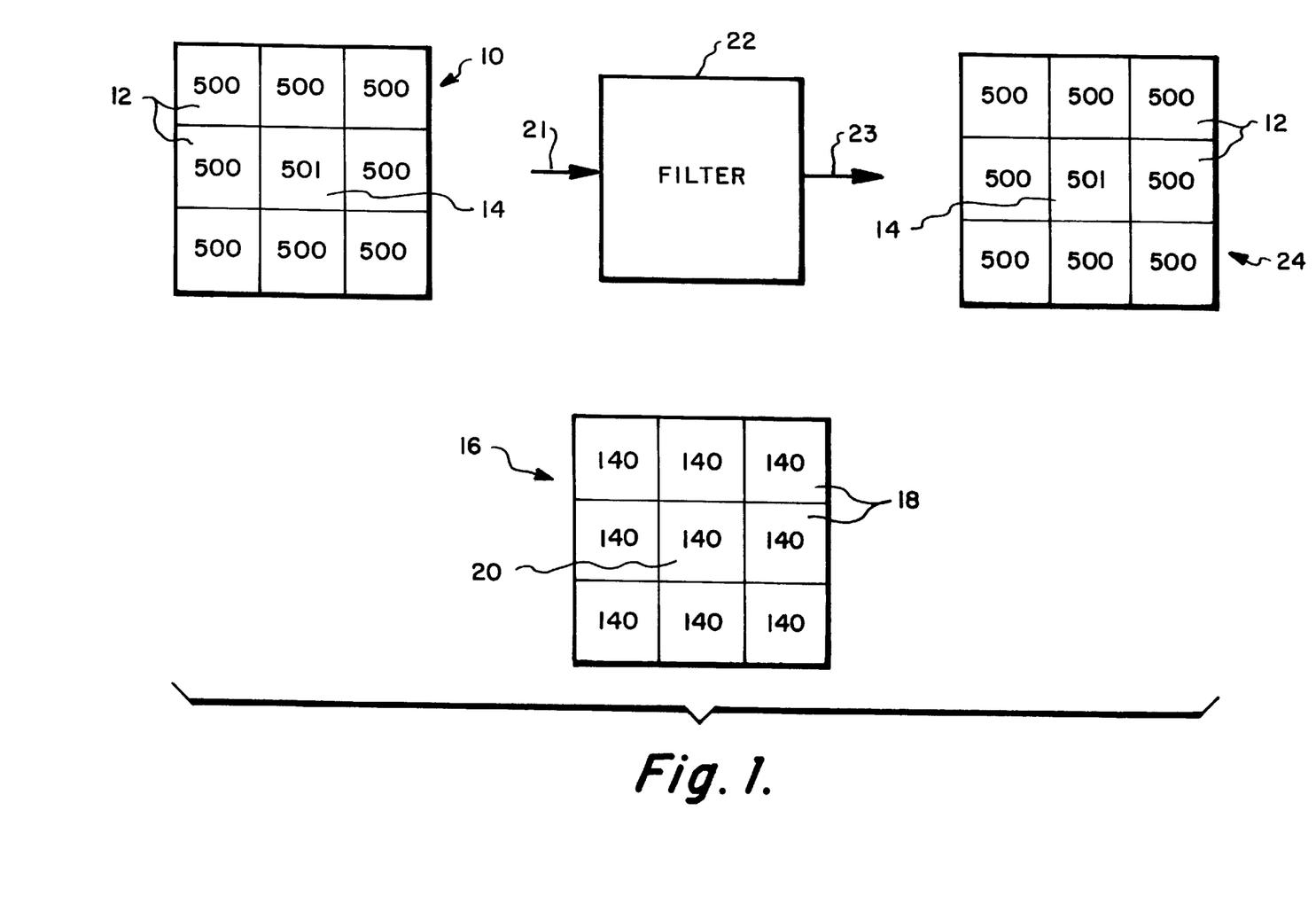
FIG. 1 illustrates a first example of an application of the filtering method of the present invention which is adapted for use with a LADAR system.
Figure 2:
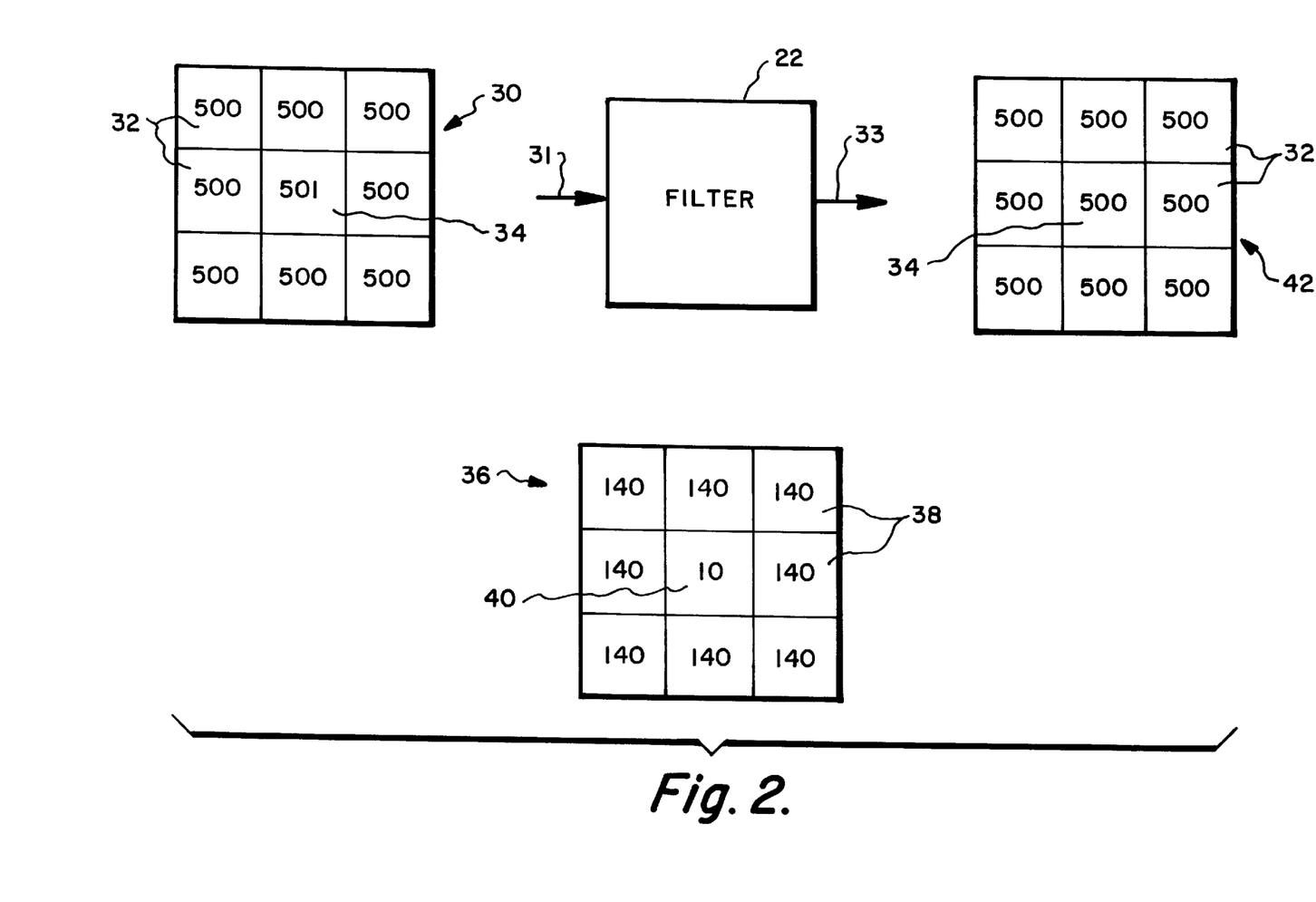
FIG. 2 illustrates a second example of an application of the filtering method of the present invention.

Referring first to the intensity guided filter software program of Appendix A, the software program of Appendix A (identified by FILE intguided.c) operates as an intensity guided filter 22 which is depicted in FIGS. 1 and 2. Recorded range pixel values of the laser radar image of a target may be in error due to a variety of reasons. For example, the return signal from the target being tracked by a LADAR system may be extremely weak with noise in the background with the result that the target's range may be difficult to determine. Intensity guided filter 22 removes background noise to allow for an accurate determination of the target's range.

Referring to FIGS. 1 and 2, the intensity guided filter 22 replaces drop-out pixels and erroneous range values in the range channel of a LADAR system with a median pixel value in a moving square window centered about the pixel being processed whenever a co-registered intensity pixel value falls below an intensity threshold. For direction detection LADAR systems, the intensity of the return pulse from a target is a measure of the quality of the signal. A high intensity image corresponds to a high degree of confidence in the accuracy of a range measurement to a target, while a low intensity image corresponds to a weak signal and a very good probability of noise contamination. During the processing of a range pixel, intensity guided filter 22 will not alter the range value of the pixel if its corresponding intensity pixel has an intensity value above the intensity threshold. When the intensity value of the corresponding intensity pixel is below the threshold, filter 22 replaces the range value with the median value of all the "good" pixels within a moving window the size of a kernel having X and Y dimensions. This results in intensity guided filter 22 smoothing out noisy pixels in the range channel while retaining edge pixel values.

Referring to FIG. 1, there is shown a 3×3 sub-image of range pixels 10 from a laser radar image of a target (not illustrated) being tracked by a LADAR system. The 3×3 sub-image of range pixels 10 includes eight edge pixels 12 and a center pixel 14 from the range channel of the LADAR system tracking the target. Each edge pixel 12 of 3×3 sub-image 10 has a range value of 500 except for center pixel 14 which has a range value of 501. FIG. 1 also depicts a corresponding 3×3 sub-image of intensity pixels 16. Sub-image 16 includes eight edge pixels 18 and a center pixel 20, each of which has a corresponding pixel in the 3×3 sub-image of range pixels 10. For example, center pixel 14 of sub-image 10 corresponding pixel in sub-image 16 is center pixel 20.

The 3×3 sub-image of range pixels 10 is supplied to an intensity guided filter 22 (as indicated by arrow 21) which filters the range pixels 12 and 14 of sub-image 10 removing therefrom any noisy pixel values which would prevent target recognition. The filter sub-image of range pixels 24 which is provided at the output of filter 22 (as indicated by arrow 23) is identical to sub-image 10 with center pixel 14 retaining its range value of 501. The range value of center pixel 14 remains at its original value because the corresponding intensity pixel value of center pixel 20 is strong (intensity value of 140) which indicates that the pixel value is acceptable.

Referring now to FIG. 2, there is shown a 3×3 sub-image or kernel of range pixels 30 from a laser radar image of the target being tracked by the LADAR system. The 3×3 sub-image of range pixels 30 includes eight edge pixels 32 and a center pixel 34 from the range channel of the LADAR system. Each edge pixel 32 of 3×3 sub-image 30 has a range value of 500 except for center pixel 34 which has a range value of 501. FIG. 2 also depicts a corresponding 3×3 sub-image of intensity pixels 36. Sub-image 36 includes eight edge pixels 38 and a center pixel 40, each of which has a corresponding pixel in the 3×3 sub-image of range pixels 30. For example, center pixel 34 of sub-image 30 corresponding pixel in sub-image 36 is center pixel 40.

The 3×3 sub-image of range pixels 20 is supplied to intensity guided filter 22 (as indicated by arrow 31) which filters the range pixels 32 and 34 of sub-image 30 removing therefrom any noisy pixel values which would prevent target recognition. The filter sub-image of range pixels 42 which is provided at the output of filter 22 (as indicated by arrow 33) is identical to sub-image 30 except for center pixel 34. Filter 22 replaces the range value of center pixel 34 with the median value of sub-image 10 which is 500 Filter 22 replaced the range value of center pixel 34 with the median value of sub-image 30 because the intensity pixel value is weak indicating that the pixel is likely to be an unacceptable measurement or noise.

Referring to FIG. 2, the software of Appendix A implements the operation of filter 22 which filters noise from a laser radar image of a target being tracked by a LADAR system. The software of Appendix A first determines the "good" or acceptable range pixels 32 for image 30. The "good" range pixels 32 for an image are defined as ±3 sigma of the average range value of the image where sigma is the standard deviation. The software of Appendix A determines "good" range pixels 32 by calculating the mean and standard deviation of all the range values in the image in accordance with the following equations.

$$\text{mean} = \frac{\sum X_i}{n} \qquad (1)$$

$$\text{standard deviation} = \sqrt{\frac{\sum [(X_i - \text{mean})^2]}{n-1}} \qquad (2)$$

where $X_i$ represents the range value of each of the pixels $X_1$, $X_2$, $X_3$... $X_i$ of the image and n is the number of pixels in the image. The range gate upper limit and the range gate lower limit are also calculated by the software of Appendix A.

It should be noted that equations (1) and (2) are the text book equations generally used to mean or average and standard deviation.

The software of Appendix A next sets the intensity threshold to 20. The possible values for the intensity threshold are 0 to 255. The intensity threshold is adaptively adjusted to the average intensity minus 3·sigma of the intensity. The software of Appendix A determines this expression by calculating the average and standard deviation of all of the intensity values of the image. Equations (1) and (2) are respectively to determine the average intensity and standard deviation of the image. Sigma of the intensity is the standard deviation of all of the intensity values of the image.

The software of Appendix A next scans the image to locate intensity pixels, such as pixel 40 which has an intensity of 10, that fall below the intensity threshold. When a pixel 40 is encountered, the surrounding "good" pixels 32 are used by the software of Appendix A to determine a median range value for the sub-image 30 which in FIG. 2 is 500. The median range value of 500 is assigned as the filtered value for pixel 34 by the software of Appendix A.

Whenever the nearby pixels are not "good" (for example, a cluster of dropout pixels) the current output pixels near the pixel being processed are used in a median filter, and a best estimate of the pixel range is obtained by the software of Appendix A. This ensures that all dropout pixels are provided a reasonable value.

Referring to the code for the software of Appendix A, the variables IMAGE *in and IMAGE *out are declared beginning at line 31. IMAGE *in is a pointer to the input image and IMAGE *out is a pointer to the output image. The variables "init krows" and "int kcols" are also declared with these variables defining the dimension of the image to be filtered in terms of the number of rows and the number of columns. Integer variables and floating point variables are declared at lines 37–49 of Appendix A.

The kernel size is set to a minimum of five if it is less than five, that is there are a minimum of five rows and five columns in the moving window (lines 53 and 54) which moves across the image being processed by the software of Appendix A. The half size of the kernel is calculated at lines 55 and 56. If five is the kernel size the half size of the kernel is two since the half size of the kernel is always an integer. At lines 58 and 59 the software of Appendix A calculates the number of rows and columns minus one in the image.

Beginning at line 60 the software of Appendix A allocates memory for a temporary list of numbers to be sorted. Beginning at line 65 the software of Appendix A duplicates the input range image which allows the software to change the range image while retaining a copy of input range image. The software also duplicates the intensity pixels of the intensity image.

Beginning at line 69 the software of Appendix A calculates the mean intensity of the image "ave" and the range of the image "ave__r". Beginning at line 86 the software of Appendix A calculates the standard deviation or sigma of intensity "sd" and the standard deviation or sigma of the range "sd__r" of the image. At lines 98 and 99 the software of Appendix A determines the three sigma bracket of the range which are "hi__range" and "low__range". At line "102" the software of Appendix A sets the intensity threshold to be the smaller of the "THRESHOLD" of twenty (line 28) and "ave–3*sd" which is mean–3·sigma.

Figure 3:
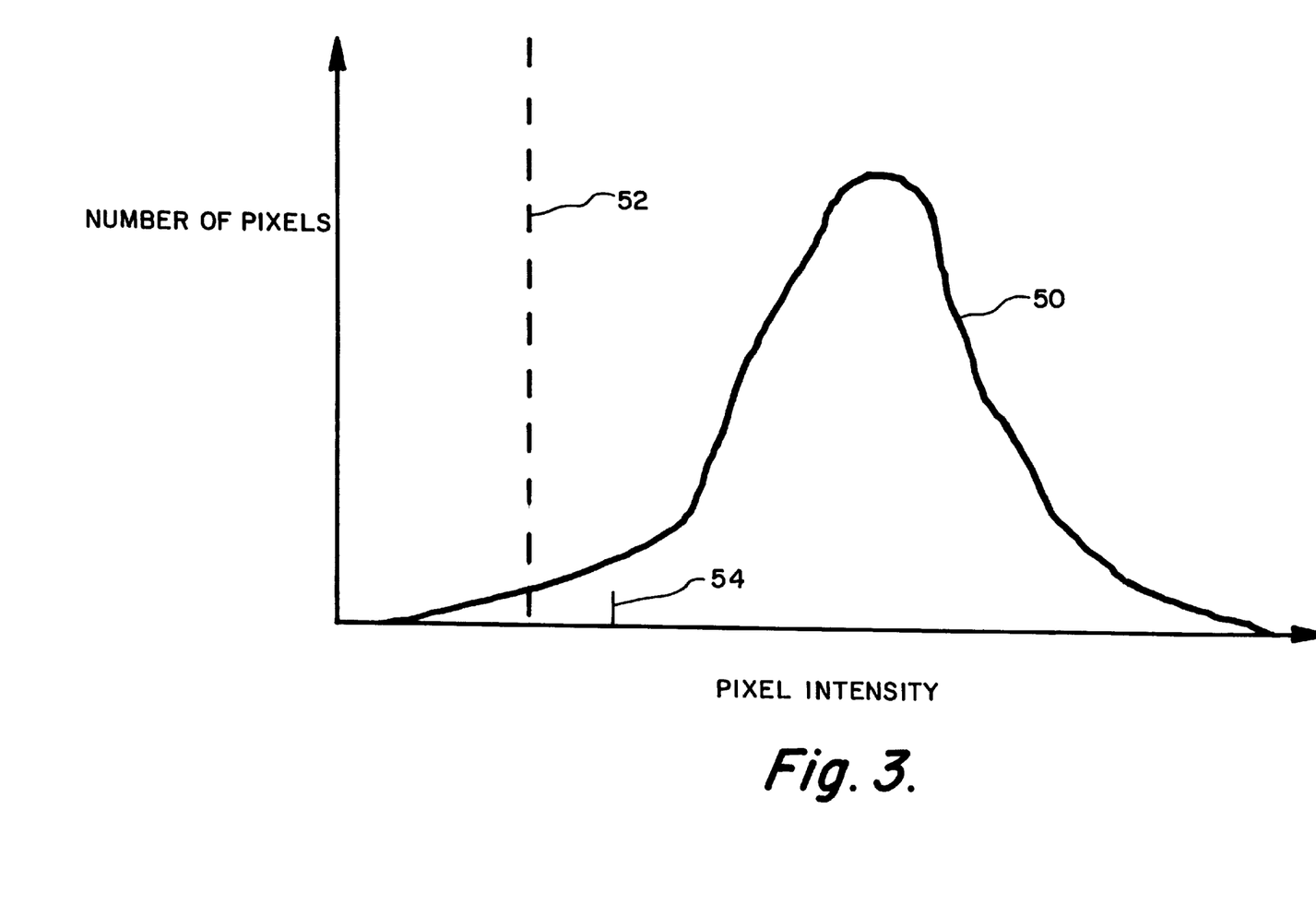
FIG. 3 is a plot illustrating pixel intensity versus the number of pixels where the intensity distribution is tightly clustered.

Referring to FIG. 3, FIG. 3 illustrates a curve 50 of the pixel intensity distribution for an image where the intensity distribution is tightly clustered. The initial threshold of 20 is depicted by dashed line 52, while the value of mean–3·sigma is depicted by arrow 54. Since the intensity distribution is tightly clustered in FIG. 3, the initial threshold 52 is used to determine when a pixel is replaced with the median pixel value in the moving window for the image being processed by filter 22.

Figure 4:
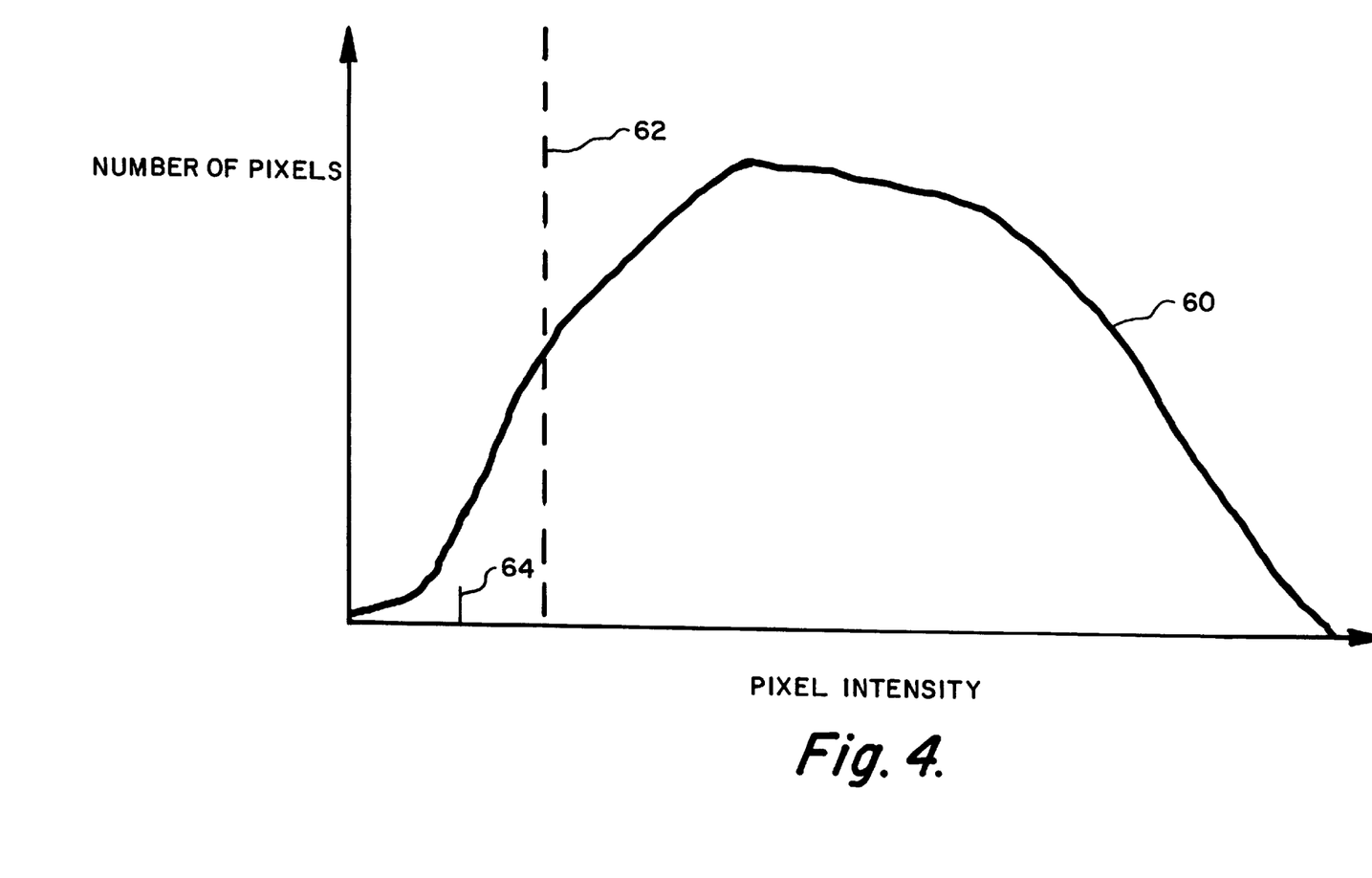
FIG. 4 is a plot illustrating pixel intensity versus the number of pixels the intensity distribution is not tightly clustered.

Referring to FIG. 4, FIG. 4 illustrates a curve 60 of the pixel intensity distribution for an image where the intensity distribution is not tightly clustered. The initial threshold of 20 is depicted by dashed line 62, while the value of mean–3·sigma is depicted by arrow 64. Since the intensity distribution is not tightly clustered in FIG. 3, the value of mean–3·sigma (arrow 64) is used to determine when a pixel is replaced with the median pixel value in the moving window for the image being processed by filter 22.

Appendix B is pseudo code of the software of Appendix A. The pseudo code is an English translation of the steps use by intensity guided filter 22 depicted in FIGS. 1 and 2 to process range pixel values of a laser radar image of a target being tracked by a LADAR system.

From the foregoing, it may readily be seen that the present invention comprises a new, unique and exceedingly useful method for filtering laser range data which constitutes a considerable improvement over the known prior art. Many modifications and variations of the present invention are possible in light of the above teachings. It is to be understood that within the scope of the appended claims the invention may be practiced otherwise than as specifically described.

Appendix A

```
/*********************************************************************/
/** FILE:           intGuided.c                                     **/
/** INCLUDE:        img.h                                           **/
/** CLASSIFICATION: UNCLASSIFIED                                    **/
/** CODE:           ANSI C                                          **/
/** DATE:           9 May 1995                                      **/
/** PROGRAMMER:     George Lam                                      **/
/**                 lam@fidler.chinalake.navy.mil                   **/
/**                                                                 **/
/** PROJECT:        Adaptive Mission Control (AMC)                  **/
/** DESCRIPTION:    Apply a filtering step only if the intensity is **/
/**                 below a certain threshold.                      **/
/** REQUIRES:       (1) pointer to the image structure to process   **/
/**                 (2) pointer to the image structure for the output **/
/**                 (3) integer number of rows in the moving window **/
/**                 (4) integer number of columns in the moving window **/
/** RETURNS:        Nothing                                         **/
/** HISTORY:                                                        **/
/*********************************************************************/
#include <stdio.h>      /* support for printf, etc. */
#include <math.h>       /* prototypes for fabs, etc. */
#include "img.h"        /* definition of IMAGE structure */
#define THRESHOLD 20.0
void intGuided(
    IMAGE *in,          /* pointer to input image */
    IMAGE *out,         /* pointer to output image */
    int krows,          /* kernel size in y dimension */
    int kcols           /* kernel size in x dimension */
)
{
    int i, j, m, n;                 /* loop counters */
    int rrk, rck;                   /* kernel dimensions divided by 2 */
    int rs, cs;                     /* image dimensions minus 1 */
    int ibeg, iend, jbeg, jend;     /* limits of the moving window */
    int k = 0;
    float *list;                    /* array to sort to find median value */
    float sd;                       /* standard deviation of intensity */
    float ave;                      /* mean intensity */
    float sd_r;                     /* standard deviation of range */
    float ave_r;                    /* average range */
    float hi_range;                 /* range gate upper limit */
    float low_range;                /* range gate lower limit */
    float threshold = THRESHOLD;    /* minimum intensity level below which is noise */
    printf( "Intensity Guided Filter - intGuided.c\n" );
    if (krows < 5) krows = 5;
    if (kcols < 5) kcols = 5;
    rrk = krows / 2;
    rck = kcols / 2;
    rs = in—>rows -1;
    cs = in—>cols -1;
    /* allocate memory for temporary list of numbers to be sorted */
    if ( ( list = (float *)calloc( krows*kcols, FDATSZ )) == NULL ) {
            printf( "Error allocating memory in intGuided.c\n" );
            exit( 0 );
    }
    /* duplicate input image range and intensity pixels to output */
    for ( i=0; i<in—>rows; i++ ) {
        for ( j=0; j<in—>cols; j++ ) {
            out—>pix[i][j] = in—>pix[i][j];
            out—>inten[i][j] = in—>inten[i][j];
        }
    }
    /* calculate the mean intensity of image */
    ave = 0.0;
    ave_r = 0.0;
    for ( i=0, i<in—>rows; i++ ) {
        for ( j=0; j<in—>cols; j++ ) {
            ave += in—>inten[i][j];
            ave_r += in—>pix[i][j];
        }
    }
    ave = ave/(in—>rows * in—>cols);
    ave_r = ave_r/(in—>rows * in—>cols);
    /* calculate standard deviation of image */
    sd = 0.0;
    sd_r = 0.0;
    for ( i=0; i<in—>rows; i++ ) {
        for ( j=0; j<in—>cols; j++ ) {
```

```
                    sd += (in—>inten[i][j]–ave)*(in—>inten[i][j]–ave);
                    sd_r += (in—>pix[i][j]–ave_r)*(in—>pix[i][j]–ave_r);
                }
            }
            sd = sqrt(sd/(in—>rows * in—>cols));
            sd_r = sqrt(sd_r/(in—>rows * in—>cols));
            hi_range = ave_r + 3.0*sd_r;
            low_range = ave_r – 3.0*sd_r;
            if ((ave–3.0*sd) > THRESHOLD) threshold = (ave–3.0*sd);
            printf ("average intensity = %f\n", ave);
            printf ("standard deviation of intensity = %f\n", sd);
            printf ("threshold for signalling weak signal = %f\n", threshold);
            for ( i=0; i<in—>rows; i++ ) {
                for ( j=0; j<in—>cols; j++ ) {
                    if (in—>inten[i][j] <= threshold || (in—>pix[i][j] > hi_range)){
                        ibeg = ( i – rrk < 0 ) ? 0 : ( i – rrk );
                        iend = ( i + rrk > rs ) ? rs : ( i + rrk );
                        jbeg = ( j – rck < 0 ) ? 0 : ( j – rck );
                        jend = ( j + rck > cs ) ? cs : ( j + rck );
                        k = 0;
                        for ( m=ibeg; m<=iend; m++ ) {
                            for ( n=jbeg; n<=jend; n++ ) {
                                if   ((in—>pix[m][n] < hi_range) &&
                                     (in—>pix[m][n] > low_range) && in—>inten[m][n]>0.0) {
                                    list[k++] = in—>pix[m][n];
                                }
                            }
                        }
                        if (k > 1) {
                            bubbleSort( list, k );
                            out—>pix[i][j] = list[k/2];
                        } else {
                            k = 0;
                            for ( m=ibeg; m<=iend; m++ ) {
                                for ( n=jbeg; n<=jend; n++ ) {
                                    if ((out—>pix[m][n] < hi_range) &&
                                        (out—>pix[m][n] > low_range) && out—>inten[m][n] > 0.0) {
                                        list[k++] = out—>pix[m][n];
                                    }
                                }
                            }
                            if (k > 0) {
                                bubbleSort( list, k );
                                out—>pix[i][j] = list[k/2];
                            }
                        }
                    }
                }
            }
            free( (void *)list );
            out—>rows = in—>rows;
            out—>cols = in—>cols;
            out—>filename = in—>filename;
            imageStats( out );
}
/******************************* End ofintGuided.c *******************************/
                                        Appendix B Pseudo Code
/** FILE:           intGuided.c
/** DESCRIPTION:    Apply a filtering step (median) only if the
/**                 intensity is below a certain threshold.            **/
/** REQUIRES:       (1) pointer to the image structure to process
/**                 (2) pointer to the image structure for the output
/**                 (3) integer number of rows in the moving window
/**                 (4) integer number of columns in the moving window
/** RETURNS:        Nothing                                            **/
#define THRESHOLD 20.0   /* initial default threshold for intensity */
void intGuided(
        IMAGE *in,              /* pointer to input image */
        IMAGE *out,             /* pointer to output image */
        int krows,              /* kernel size in y dimension */
        int kcols               /* kernel size in x dimension */
)
{
        int i, j, m, n;          /* loop counters */
        int rrk, rck;            /* kernel dimensions divided by 2 */
        int rs, cs;              /* image dimensions minus 1 */
        int ibeg, iend, jbeg, jend;   /* limits of the moving window */
        int k = 0;
```

-continued

```
        float *list;              /* array to sort to find median value */
        float sd;                 /* standard deviation of intensity */
        float ave;                /* mean intensity */
        float sd_r;               /* standard deviation of range */
    float ave_r;                  /* average range */
    float hi_range;               /* range gate upper limit */
    float low_range;              /* range gate lower limit */
    float threshold = THRESHOLD;  /* minimum intensity level below which is noise */
/* we would prefer a minimum kernel size of 5, if less than 5 */
/* set to equal to 5 */
/* calculate the half size of the kernel */
/* calculate the number of rows and columns −1 */
/* allocate memory for temporary list of numbers to be sorted */
/* duplicate input image range and intensity pixels to output */
/* calculate the mean intensity and range of image */
/* calculate standard deviation of intensity and range image */
/* determine the 3 sigma bracket of the range */
/* set the intensity threshold to be the smaller of THRESHOLD and
    the ave-3*sigma */
/* scan every pixel in the image */
/* do filtering if the amplitude or intensity is low */
/* calculate the moving window limits */
/* pick up every "good" pixel within this moving window */
/* and assign it to a list for sorting */
/* if more than 2 "good" pixels in moving window, do
    median filtering */
/* sort */
/* median assigned */
/* else if less than 2 "good" pixels, use the current output as input, apply a median filter to fill in
    the big gapping hole with a best guess pixel value */
/* if still less than 1 good pixel, use original pixel value*/
/* free up memory for list */
/* update file header information */
```

What is claimed is:

1. A system for filtering a range image reflected from a target being tracked by a laser detection and ranging system comprising:

receiving means for receiving an array of range pixels representing said range image of said target;

said receiving means receiving an array of intensity pixels representing an intensity image of said target;

means for calculating a mean value and a standard deviation for said array of intensity pixels of said target in accordance with the equations:

$$\text{mean intensity} = \frac{\sum X_i}{n}$$

$$\text{standard deviation intensity} = \sqrt{\frac{\sum [(X_i - \text{mean})^2]}{n-1}}$$

where $X_i$ represents an intensity value for each of the intensity pixels $X_1, X_2, X_3 \ldots X_n$ in the array of intensity pixels of said target and n is the number of intensity pixels in the array of intensity pixels of said target;

means for initially setting an intensity threshold at a predetermined intensity level and then adjusting said intensity threshold to the greater value of said predetermined intensity level and a calculated intensity threshold determined in accordance with the following equation:

Calibrated Threshold=mean−3·sigma where mean is the mean intensity value for said array of intensity pixels and sigma is the standard deviation for said array of intensity pixels;

moving window means for simultaneously scanning a sub-image of said array of range pixels of said target and a corresponding sub-image of said array of intensity pixels of said target; and filtering means for replacing the range value of a center pixel within the sub-image of said array of range pixels being scanned by said moving window means with a median value of the remaining range pixels in the sub-image of said array of range pixels being scanned by said moving window means whenever a corresponding center pixel of the corresponding sub-image of said array of intensity pixels is below said intensity threshold.

2. The system of claim 1 wherein said array of range pixels of said target and said array of image pixels of said target each comprise an array having an array size of 256 pixels per row by 256 pixels per column.

3. The system of claim 1 wherein said calculating means calculates a mean value and a standard deviation for said array of range pixels of said target in accordance with the equations:

$$\text{mean range} = \frac{\sum X_i}{n}$$

$$\text{standard deviation range} = \sqrt{\frac{\sum [(X_i - \text{mean})^2]}{n-1}}$$

where $X_i$ represents a range value for each of the range pixels $X_1, X_2, X_3 \ldots X_n$ in the array of range pixels of said target and n is the number of range pixels in the array of range pixels of said target.

4. The system of claim 3 further comprising means for determining acceptable range pixels with said array of range pixels, the range value of said acceptable range pixels being defined as±three sigma of the mean value of said array of range pixels where sigma is the standard deviation of said array of range pixels.

5. The system of claim 1 wherein said predetermined intensity level is twenty.

6. A system for filtering a range image reflected from a target being tracked by a laser detection and ranging system comprising:

receiving means for receiving an array of range pixels representing said range image of said target;

said receiving means receiving an array of intensity pixels representing an intensity image of said target;

means for calculating a mean value and a standard deviation for said array of intensity pixels of said target in accordance with the equations:

$$\text{mean intensity} = \frac{\sum X_i}{n}$$

$$\text{standard deviation intensity} = \sqrt{\frac{\sum[(X_i - \text{mean})^2]}{n-1}}$$

where $X_i$ represents an intensity value for each of the intensity pixels $X_1, X_2, X_3 \ldots X_n$ in the array of intensity pixels of said target and n is the number of intensity pixels in the array of intensity pixels of said target;

means for initially setting an intensity threshold at a predetermined intensity level and then adjusting said intensity threshold to the greater value of said predetermined intensity level and a calculated intensity threshold determined in accordance with the following equation:

Calibrated Threshold=mean−3·sigma where mean is the mean intensity value for said array of intensity pixels and sigma is the standard deviation for said array of intensity pixels;

moving window means for simultaneously scanning a sub-image of said array of range pixels of said target and a corresponding sub-image of said array of intensity pixels of said target; and filtering means for replacing the range value of a center pixel within the sub-image of said array of range pixels being scanned by said moving window means with a median value of the remaining range pixels in the sub-image of said array of range pixels being scanned by said moving window means whenever a corresponding center pixel of the corresponding sub-image of said array of intensity pixels is below said intensity threshold;

said sub-image of said array of range pixels being scanned by said moving window means and said corresponding sub-image of said array of intensity pixels being scanned by said moving window means each comprising an array having an array size of at least five pixels per row by five pixels per column.

7. The system of claim 6 wherein said array of range pixels of said target and said array of image pixels of said target each comprise an array having an array size of 256 pixels per row by 256 pixels per column.

8. The system of claim 6 wherein said calculating means calculates a mean value and a standard deviation for said array of range pixels of said target in accordance with the equations:

$$\text{mean range} = \frac{\sum X_i}{n}$$

$$\text{standard deviation range} = \sqrt{\frac{\sum[(X_i - \text{mean})^2]}{n-1}}$$

where $X_i$ represents a range value for each of the range pixels $X_1, X_2, X_3 \ldots X_n$ in the array of range pixels of said target and n is the number of range pixels in the array of range pixels of said target.

9. The system of claim 8 further comprising means for determining acceptable range pixels with said array of range pixels, the range value of said acceptable range pixels being defined as±three sigma of the mean value of said array of range pixels where sigma is the standard deviation of said array of range pixels.

10. The system of claim 6 wherein said predetermined intensity level is twenty.

11. A method for filtering a range image reflected from a target being tracked by a laser detection and ranging system comprising the steps of:

(a) receiving an array of range pixels representing said range image of said target;

(b) receiving an array of intensity pixels representing an intensity image of said target;

(c) calculating a mean value and a standard deviation for said array of intensity pixels of said target in accordance with the equations:

$$\text{mean intensity} = \frac{\sum X_i}{n}$$

$$\text{standard deviation intensity} = \sqrt{\frac{\sum[(X_i - \text{mean})^2]}{n-1}}$$

where $X_i$ represents an intensity value for each of the intensity pixels $X_1, X_2, X_3 \ldots X_n$ in the array of intensity pixels of said target and n is the number of intensity pixels in the array of intensity pixels of said target;

(e) setting an intensity threshold at a predetermined intensity level;

(f) adjusting said intensity threshold to the greater value of said predetermined intensity level and a calculated intensity threshold determined in accordance with the following equation:

Calibrated Threshold=mean−3·sigma where mean is the mean intensity value for said array of intensity pixels and sigma is the standard deviation for said array of intensity pixels;

(g) scanning simultaneously sub-images of said array of range pixels of said target and corresponding sub-images of said array of intensity pixels of said target; and (h) replacing the range value of a center pixel within the sub-image of said array of range pixels currently being scanned with a median value of the remaining range pixels in the sub-image currently being scanned whenever a corresponding center pixel of the corresponding sub-image of said array of intensity pixels is below said intensity threshold.

12. The method of claim 11 wherein said array of range pixels of said target and said array of image pixels of said target each comprise an array having an array size of 256 pixels per row by 256 pixels per column.

13. The method of claim 11 wherein each of said sub-images of said array of range pixels of said target and each of said corresponding sub-images of said array of intensity pixels of said target comprises an array having an array size of at least five pixels per row by five pixels per column.

14. The method of claim 10 wherein said predetermined intensity level is twenty.

* * * * *